US009798682B2

(12) United States Patent
Walker et al.

(10) Patent No.: US 9,798,682 B2
(45) Date of Patent: *Oct. 24, 2017

(54) COMPLETION NOTIFICATION FOR A STORAGE DEVICE

(71) Applicant: Dell Products L.P., Round Rock, TX (US)

(72) Inventors: Don H. Walker, Georgetown, TX (US); William Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/739,709

(22) Filed: Jun. 15, 2015

(65) Prior Publication Data

US 2015/0278130 A1 Oct. 1, 2015

Related U.S. Application Data

(63) Continuation of application No. 13/720,596, filed on Dec. 19, 2012, now Pat. No. 9,122,515.

(51) Int. Cl.
*G06F 13/36* (2006.01)
*G06F 13/24* (2006.01)
(Continued)

(52) U.S. Cl.
CPC ............ *G06F 13/24* (2013.01); *G06F 3/0659* (2013.01); *G06F 9/45533* (2013.01);
(Continued)

(58) Field of Classification Search
CPC .. G06F 13/24; G06F 13/4221; G06F 13/4022; G06F 9/45558; G06F 9/45533;
(Continued)

(56) References Cited

U.S. PATENT DOCUMENTS

| 5,875,343 A | 2/1999 | Binford et al. ............... 710/263 |
| 2004/0085984 A1 | 5/2004 | Elzur ........................... 370/412 |

(Continued)

OTHER PUBLICATIONS

Ahmad, Irjan, et al., "Improving Performance with Interrupt Coalescing for Virtual Machine Disk IO in VMware ESX Server", Second International Workshop on Visualization Performance Analysis, Characterization, and Tools (VPACT '09), 2009.

*Primary Examiner* — Jing-Yih Shyu
(74) *Attorney, Agent, or Firm* — Baker Botts L.L.P.

(57) ABSTRACT

A method for providing notification of completion of a computing task includes providing access to an information handling resource for a first information handling system, registering the first information handling system with a first completion queue, submitting commands from the first information handling system to a first submission queue, providing access to the information handling resource for second first information handling system, registering the second information handling system with the first completion queue, and submitting commands from the second information handling system to a second submission queue. Upon execution of commands in the first submission queue and the second submission queue, an entry in is created a first completion queue. Upon the creation of an entry in the first completion queue, an interrupt is selectively sent to the first information handling resource and to the second information handling resource.

21 Claims, 5 Drawing Sheets

(51) Int. Cl.
  *G06F 9/48* (2006.01)
  *G06F 3/06* (2006.01)
  *G06F 9/455* (2006.01)
  *G06F 13/40* (2006.01)
  *G06F 13/42* (2006.01)

(52) U.S. Cl.
  CPC ........ *G06F 9/45558* (2013.01); *G06F 9/4812* (2013.01); *G06F 13/4022* (2013.01); *G06F 13/4221* (2013.01); *G06F 2009/45579* (2013.01)

(58) Field of Classification Search
  CPC ................ G06F 3/0659; G06F 9/4812; G06F 2009/45579
  See application file for complete search history.

(56) References Cited

U.S. PATENT DOCUMENTS

| | | | |
|---|---|---|---|
| 2005/0021879 A1 | 1/2005 | Douglas | 710/5 |
| 2005/0066333 A1 | 3/2005 | Krause et al. | 719/310 |
| 2006/0059328 A1* | 3/2006 | Toyohara | G06F 12/109 713/1 |
| 2006/0195618 A1* | 8/2006 | Arndt | G06F 9/45537 710/1 |
| 2006/0195848 A1* | 8/2006 | Arndt | G06F 9/45537 718/104 |
| 2006/0212607 A1 | 9/2006 | Riethmuller | 710/6 |
| 2008/0288661 A1 | 11/2008 | Galles | 710/3 |
| 2011/0179413 A1 | 7/2011 | Subramanian et al. | 718/1 |
| 2011/0179416 A1 | 7/2011 | Patale et al. | 718/1 |
| 2012/0124572 A1 | 5/2012 | Cunningham et al. | 718/1 |
| 2012/0254484 A1* | 10/2012 | Yang | G06F 9/545 710/47 |
| 2013/0024875 A1* | 1/2013 | Wang | G06F 13/22 719/318 |
| 2013/0086336 A1 | 4/2013 | Canepa et al. | 711/154 |
| 2013/0191590 A1 | 7/2013 | Malwankar | 711/114 |
| 2014/0310369 A1 | 10/2014 | Makhervaks et al. | 709/207 |

* cited by examiner

COMPLETION NOTIFICATION FOR A STORAGE DEVICE

RELATED APPLICATIONS

This application is a continuation of U.S. patent application Ser. No. 13/720,596 filed Dec. 19, 2012, issued as U.S. Pat. No. 9,122,515 on Sep. 1, 2015, the contents of which is incorporated herein in its entirety by this reference.

TECHNICAL FIELD

The present disclosure relates in general to information handling systems, and more particularly to completion notification for a storage device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output ("I/O") resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with communications and notifications of completions and other events within in a shared input/output infrastructure have been reduced or eliminated.

In accordance with some embodiments of the present disclosure, an apparatus includes an interface configured to provide access to the apparatus for a first information handling system and a second information handling system, an information handling resource, a first submission queue configured to be registered with the first information handling system and to receive commands from the first information handling system for accessing the information handling resource, a second submission queue configured to be registered with the second information handling system and to receive commands from the second information handling system for accessing the information handling resource, a first completion queue, and a command execution unit configured to execute commands from the first submission queue and the second submission queue. Upon execution of a command from the first submission queue or the second submission queue, the command execution unit is configured to add an entry to the first completion queue. Upon adding an entry to the first completion queue, the interface is configured to selectively send an interrupt to the first information handling system and a second information handling system.

In accordance with some embodiments of the present disclosure, a method for providing notification of completion of a computing task includes providing access to an information handling resource for a first information handling system, registering the first information handling system with a first completion queue, submitting commands from the first information handling system to a first submission queue, providing access to the information handling resource for second first information handling system, registering the second information handling system with the first completion queue, and submitting commands from the second information handling system to a second submission queue. Upon execution of commands in the first submission queue and the second submission queue, an entry in is created a first completion queue. Upon the creation of an entry in the first completion queue, an interrupt is selectively sent to the first information handling system and to the second information handling system.

In accordance with some embodiments of the present disclosure, an article of manufacture includes a computer readable medium and computer-executable instructions carried on the computer readable medium. The instructions are readable by a processor. The instructions, when read and executed, cause the processor to provide access to an information handling resource for a first information handling system, register the first information handling system with a first completion queue, submit commands from the first information handling system to a first submission queue, provide access to the information handling resource for a second information handling system, register the second information handling system with the first completion queue, and submit commands from the second information handling system to a second submission queue. Upon execution of commands in the first submission queue and the second submission queue, an entry is created in a first completion queue. Upon the creation of an entry in the first completion queue, an interrupt is selectively sent to the first information handling system and to the second information handling system.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
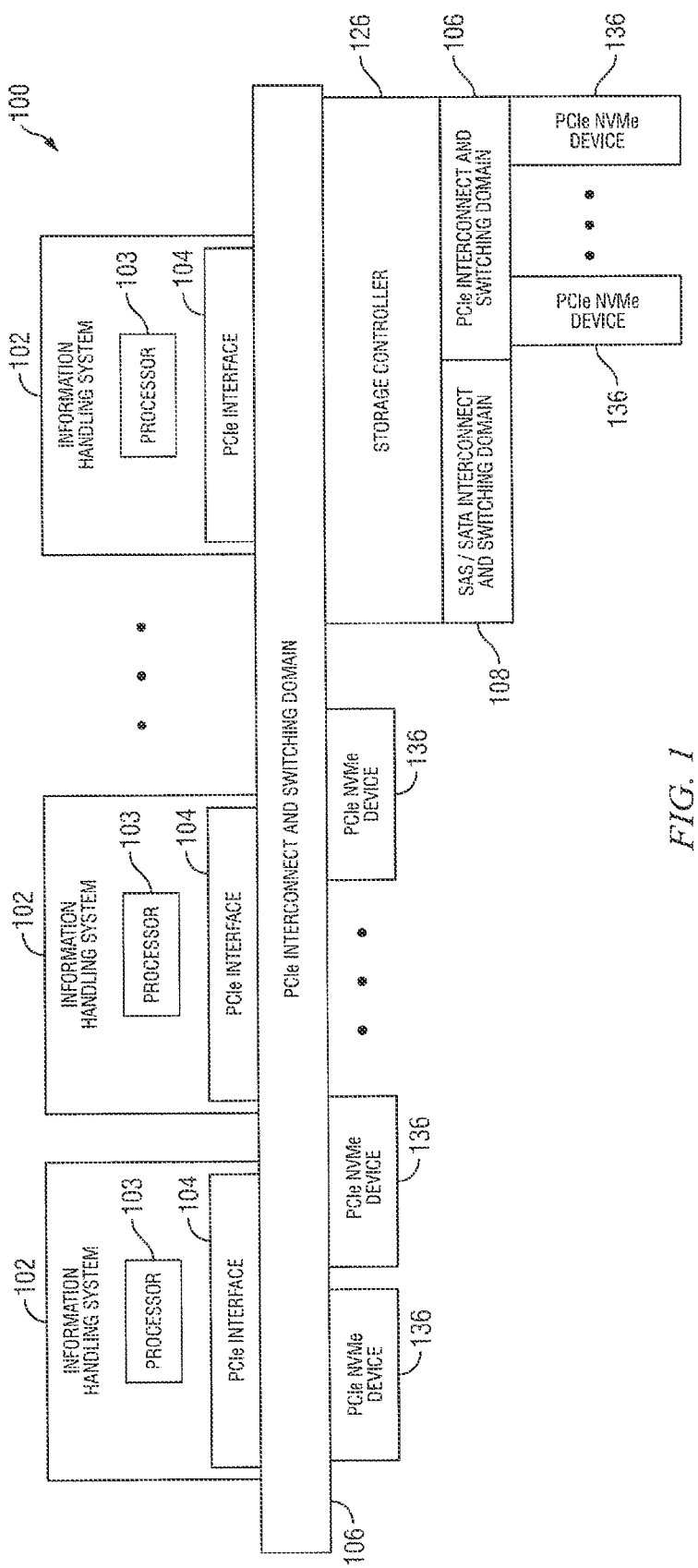
FIG. 1 illustrates a block diagram of an example physical system having multiple information handling systems and with various capabilities, in accordance with certain embodiments of the present disclosure.

Preferred embodiments and their advantages are best understood by reference to FIGS. 1-6, wherein like numbers are used to indicate like and corresponding parts.

For the purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example physical system 100 having multiple information handling systems 102, in accordance with certain embodiments of the present disclosure. System 100 may be configured to provide completion notification for subscribers of a device 136. Device 136 may include a Peripheral Component Interconnect ("PCI") or Peripheral Component Interconnect Express ("PCIe") device. In one embodiment, such a device may include a storage device such as a solid state disk ("SSD"). Such a completion notification may utilize an interface using Non-Volatile Memory Express ("NVMe") protocols. Further, such a completion notification may utilize virtualization technologies, such as a hypervisor, Single-Root ("SR")-Input-Output Virtualization ("IOV") or Multi-Root ("MR")-IOV techniques. Using SR-IOV or MR-IOV, a plurality of subscribers such as individual information handling systems may share a given device 136 for which completion notification is provided.

As depicted in FIG. 1, system 100 may comprise a plurality of information handling systems 102, one or more interconnect and switching domains such as PCIe interconnect and switching domains 106 or Serial Attached Small Computer System Interface/Serial Advanced Technology Attachment (SAS/SATA) interconnect and switching domain 108, devices 136, and controllers such as storage controller 126.

An information handling system 102 may generally be operable to receive data from and/or communicate data to one or more devices 136 and/or other information handling resources of system 100 via any suitable mechanism, such as interconnect and switching domains such as PCIe interconnect and switching domains 106 or SAS/SATA interconnect and switching domain 108. In certain embodiments, an information handling system 102 may include a server, computer, blade server, mobile device, laptop, or any other suitable mechanism, As depicted in FIG. 1, an information handling system 102 may include one or more processors 103 and any number and kind of interfaces such as PCIe interface 104 communicatively coupled to processor 103.

A processor 103 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a hard drive, and/or another component of system 100.

An interface such as PCIe interface 104 may comprise any system, device, or apparatus configured to provide an interface between its associated information handling system 102 and devices or other interfaces, such as PCIe interconnect and switching domains 106 or SAS/SATA interconnect and switching domain 108. In some embodiments, PCIe interface 104 may comprise PCIe cards configured to create a PCIe-compliant interface between its associated information handling system 102 and PCIe interconnect and switching domains 106 or SAS/SATA interconnect and switching domain 108.

PCIe interconnect and switching domains 106 or SAS/SATA interconnect and switching domain 108 may include any system, device, or apparatus configured to interconnect modular information handling systems 102 with information handling resources, such as devices 136, controllers such as storage controller 126, or other interconnect and switching domains.

PCIe interconnect and switching domains 106 or SAS/SATA interconnect and switching domain 108 may comprise any system, device, or apparatus configured perform switching between information handling systems 102 and other parts of system 100. In various embodiments, a PCIe switch, generalized PC bus switch, an Infiniband switch, or other suitable switch may be used. In such embodiments, PCIe interconnect and switching domains 106 or SAS/SATA interconnect and switching domain 108 may operate in a redundant mode for shared devices (e.g., storage controllers 126 and/or devices 136) and in non-redundant mode for non-shared devices. As used herein, shared devices may refer to those which may be visible to more than one information handling system 102, while non-shared devices may refer to those which are visible to only a single information handling system 102.

As depicted in FIG. 1, a PCIe interconnect and switching domain 106 or SAS/SATA interconnect and switching domain 108 may have coupled thereto one or more devices 136.

When a system (e.g., system 100) is architected so as to allow information handling information handling resources, such as those of devices 136, to allow shared resources such that the information handling resources may be assigned to one information handling system or shared among a plurality of information handling systems, challenges may arise when needing to service an information handling resource.

Shared resources or devices, such as PCIe or NVMe devices 136 may be virtualized across multiple information handling systems 102. Non-shared resources or devices may be partitioned such that they are visible only to a single information handling system 102 at time.

Figure 2:
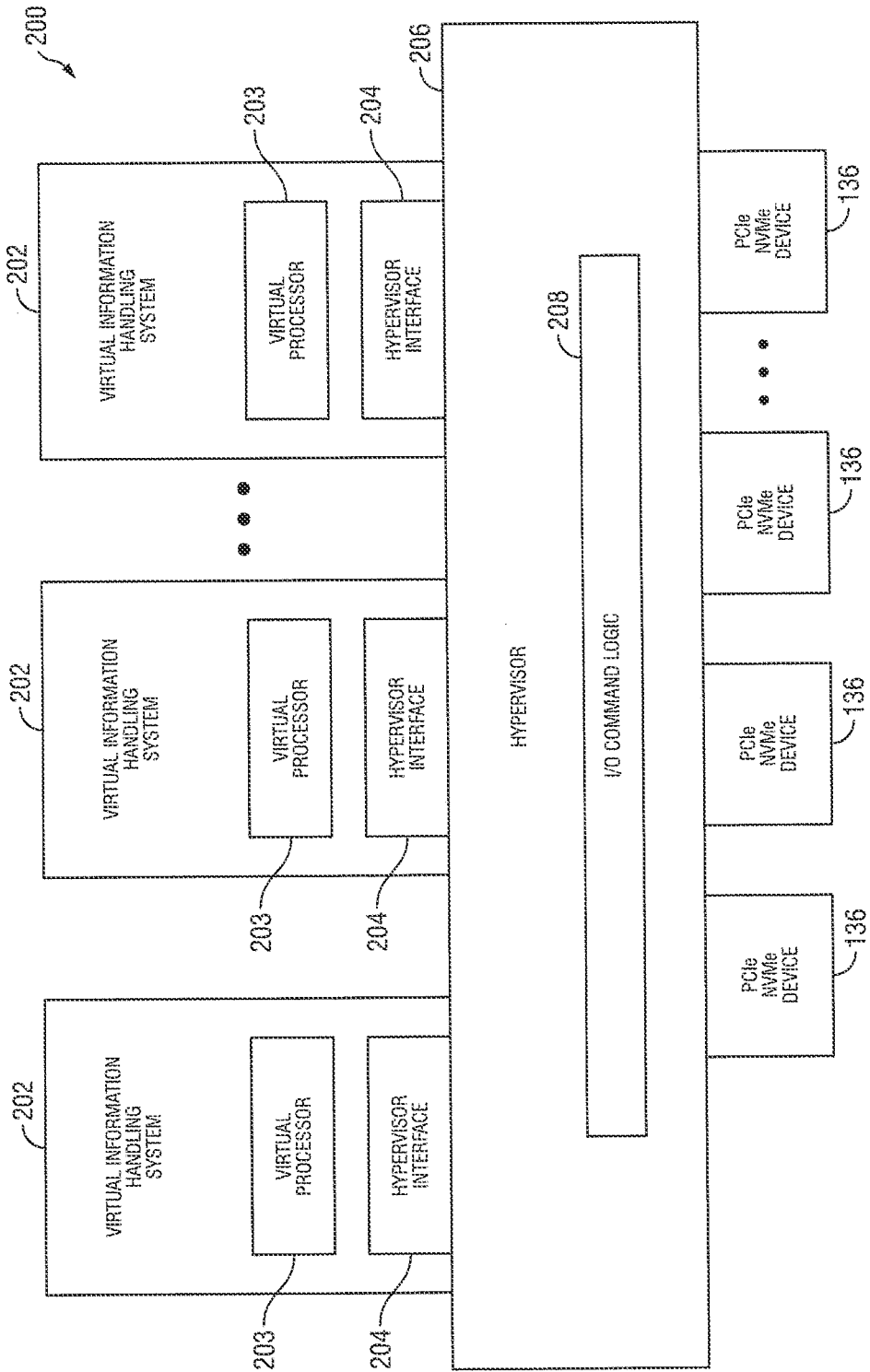
FIG. 2 illustrates an example system configured to provide virtualization of a single information handling resource to multiple information handling systems.

FIG. 2 illustrates an example system 200 configured to provide virtualization of a single information handling resource to multiple information handling systems. In one embodiment, system 200 may be configured to provide completion notification in accordance with certain embodiments of the present disclosure. Such notification may be performed with the use of a hypervisor 206. System 200 may be implemented by any suitable physical system, such as system 100 of FIG. 1 or system 300 of FIG. 3.

System 200 may include multiple virtual information handling systems 202. Such virtual information handling systems 202 may each correspond to an individual, physical information handling system or one or more virtual machines operating on a physical information handling system. Virtual information handling systems 202 may be communicatively coupled to information handling resources such as device 136 by hypervisor 206.

Hypervisor 206 may include a virtual machine manager (VMM) and may be implemented in logic, code, software, applications, scripts, executables, or any other suitable entity. Hypervisor 206 may include hardware virtualization for allowing multiple operating systems to run concurrently on an information handling system. Furthermore, hypervisor 206 may establish multiple such operating systems to run on multiple information handling systems. Hypervisor 206 may be configured to move the operation of a guest operating system from one information handling system to another. Hypervisor 206 may appear to its virtual information handling systems 202 to be an operating platform that has abstracted away the physical resources, such as device 136. Such resources may also include processing capabilities in the form of a virtual processor 203. Hypervisor 206 may present to the virtual information handling systems 202 a virtual operating platform and may manage the execution of the virtual information handling systems 202.

Thus, system 200 illustrates that an information handling resources, such as device 136, may be shared among multiple information handling systems, multiple virtual machines operating on the same information handling system, or a combination thereof.

In one embodiment, each of virtual information handling systems 202 may be communicatively coupled to hypervisor 206 through hypervisor interfaces 204. Each of hypervisor interfaces 204 may include a physical interface (such as a PCIe interface), a series of application programming interfaces (API), or other suitable modules. Virtual information handling systems 202 may be communicatively coupled to devices 136 through hypervisor interface 204 and hypervisor 206. Thus, hypervisor 206 may provide management and handling of information handling resources in devices 136 to each of virtual information handling systems 202.

To maintain routes between given virtual information handling systems 202 and devices 136, hypervisor 206 may include virtual hierarchies from devices 136 to virtual information handling systems 202. Particular functions, such as calls to hypervisor 206, virtual functions or shared functions, may be provided. In one embodiment, wherein device 136 contains multiple information handling resources such as a storage device and a USB interface, a function may be provided for each such information handling resource. Thus, from the perspective of virtual information handling systems 202, the multiple such information handling resources may appear to be separate and unrelated. Furthermore, a virtual function may be provided for each such virtual information handling system 202 that may share access to device 136. A given device 136 which has been virtualized may be accessed by such two or more virtual functions, which allow the sharing of the resource.

Hypervisor 206 may include I/O command logic 208 configured to route, switch, control, or otherwise direct access by virtual information handling systems 202 of devices 136. Furthermore, I/O command logic 208 may be configured to route, switch, or control interconnects, such as those illustrated in FIG. 1. Such routing may be used to provide virtualization sharing and simultaneous communication between, for example, information handling systems 202 and devices 136.

Code executing on any of virtual information handling systems 202 may access one or more of devices 136 through calling functions in an API. The code executing simultaneously on each such virtual information handling system 202 may issue commands or functions that are to be executed on device 136. Device 136 may respond to the specific virtual information handling system 202 that initiated the command to notify that the command has completed. Furthermore, device 136 may communicate with particular one or more of virtual information handling systems 202 that need to be notified of an event that specifically addresses a give virtual information handling system 202. For a given response or notice, device 136 may avoid communicating with virtual information handling systems 202 that do not need to receive a copy of the response or notice.

Figure 3:
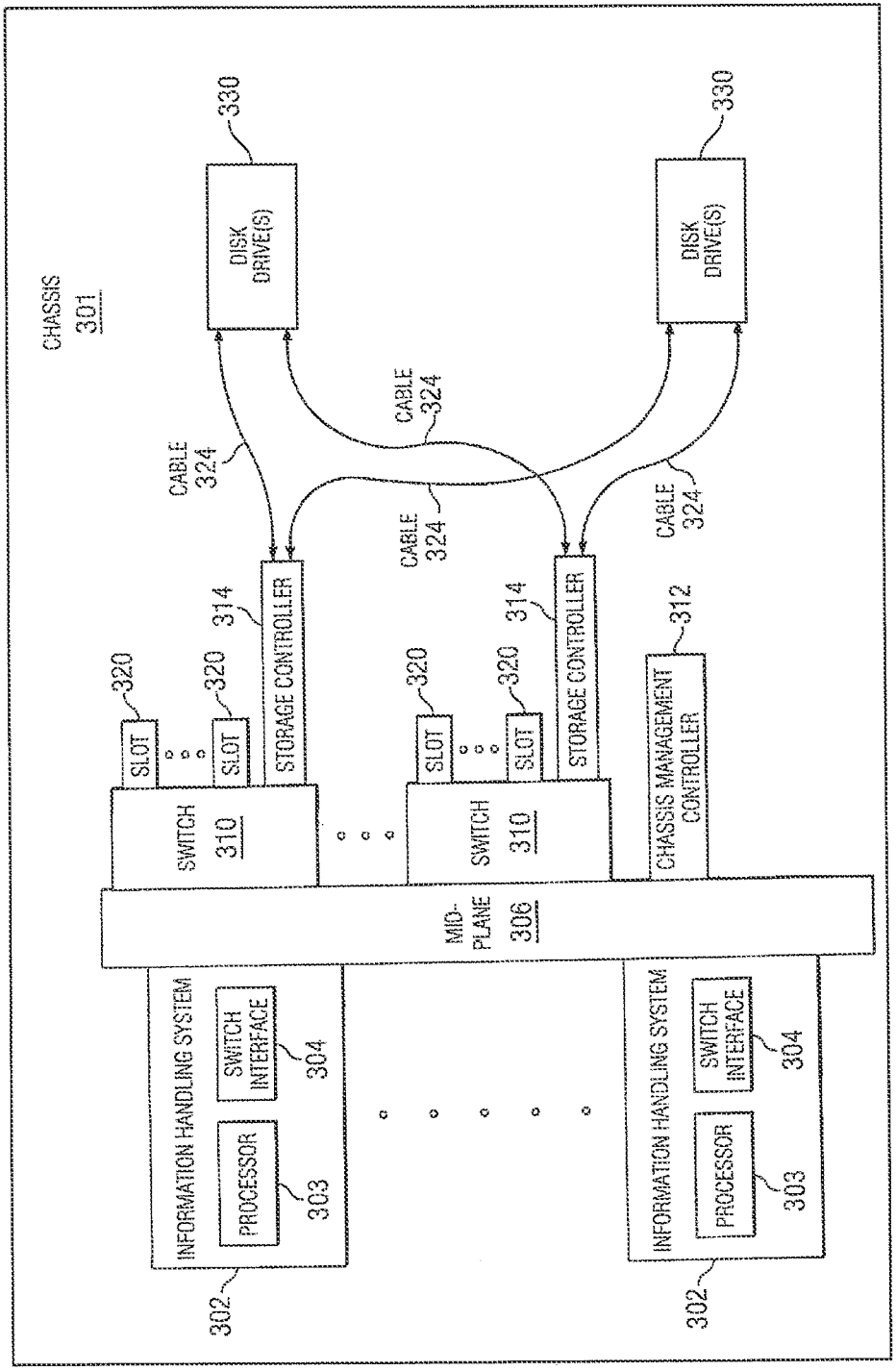
FIG. 3 illustrates a block diagram of an example system having a chassis with multiple information handling systems and with various peripheral and input/output capabilities common to a chassis as a whole, in accordance with certain embodiments of the present disclosure.

FIG. 3 illustrates a block diagram of an example system 300 having a chassis 301 with multiple information handling systems 302 and with various peripheral and input/output capabilities common to chassis 301 as a whole, in accordance with certain embodiments of the present disclosure. System 300 may be configured to provide completion notification for subscribers of a device such as a Peripheral Component Interconnect ("PCI") or Peripheral Component Interconnect Express ("PCIe") device. In one embodiment, such a device may include a storage device such as a solid state disk ("SSD"). Such a completion notification may utilize an interface using Non-Volatile Memory Express ("NVMe") protocols. Further, such a completion notification may utilize Single-Root ("SR")-Input-Output Virtualization ("IOV") or Multi-Root ("MR")-IOV techniques. Using SR-IOV or MR-IOV, a plurality of subscribers such as individual information handling systems may share the device for which completion notification is provided.

As depicted in FIG. 3, system 300 may comprise a chassis 301 including a plurality of information handling systems 302, a mid-plane 306, one or more switches 310, one or more chassis management controllers 312, one or more slots 320, and a plurality of devices such as disk drives 330.

An information handling system 302 may generally be operable to receive data from and/or communicate data to one or more devices such as disk drives 330 and/or other information handling resources of chassis 301 via mid-plane 306. In certain embodiments, an information handling system 302 may be a server. In such embodiments, an information handling system may comprise a blade server having modular physical design. In these and other embodiments, an information handling system 302 may comprise an M class server. As depicted in FIG. 3, an information handling system 302 may include a processor 303 and one or more switch interfaces 304 communicatively coupled to processor 303.

A processor 303 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, processor 303 may interpret and/or execute program instructions and/or process data stored in a memory, a hard drive 330, and/or another component of system 300.

A switch interface 304 may comprise any system, device, or apparatus configured to provide an interface between its associated information handling system 302 and switches 310. In some embodiments, switches 310 may comprise PCIe switches, in which case a switch interface 304 may comprise a switch card configured to create a PCIe-compliant interface between its associated information handling system 302 and switches 310. In other embodiments, a switch interface 304 may comprise an interposer. Use of switch interfaces 304 in information handling systems 302 may allow for minimal changes to be made to traditional servers (e.g., M class servers) while supporting the overall system architecture disclosed herein. Although FIG. 3 depicts an implementation including a single switch interface 304 per information handling system 302, in some embodiments each information handling system 302 may include a plurality of switch interfaces 304 for redundancy, high availability, and/or other reasons.

Mid-plane 306 may comprise any system, device, or apparatus configured to interconnect modular information handling systems 302 with information handling resources. Accordingly, mid-plane 306 may include slots and/or connectors configured to receive information handling systems 302, switches 310, chassis management controllers 312, a plurality of controllers such as storage controllers 314, and/or other information handling resources. Mid-plane 306 may include one or more boards or cabling configured to interconnect modular information handling systems 302 with information handling resources.

A switch 310 may comprise any system, device, or apparatus configured to couple information handling systems 302 to storage controllers 314 (e.g., via mid-plane 306) and slots 320 and perform switching between information handling systems 302 and various information handling resources of system 300, including storage controllers 314 and slots 320. In certain embodiments, a switch 310 may comprise a PCIe switch. In other embodiments, a switch may comprise a generalized PC bus switch, an Infiniband switch, or other suitable switch. As shown in FIG. 3, chassis 301 may include a plurality of switches 310. In such embodiments, switches 310 may operate in a redundant mode for shared devices (e.g., storage controllers 314 and/or devices coupled to slots 320) and in non-redundant mode for non-shared/zoned devices. As used herein, shared devices may refer to those which may be visible to more than one information handling system 302, while non-shared devices may refer to those which are visible to only a single information handling system 302. In some embodiments, mid-plane 306 may include a single switch 310.

Although FIG. 3 depicts chassis as having one chassis management controller 312, chassis 301 may include any suitable number chassis management controllers 312.

A controller such as storage controller 314 may include any system, apparatus, or device operable to manage the communication of data between one or more of information handling systems 302 and one or more devices such as disk drives 330. In certain embodiments, a storage controller 314 may provide functionality including, without limitation, disk aggregation and redundancy (e.g., RAID), input/output routing, and error detection and recovery. Storage controller 314 may be communicatively coupled to a single set of devices such as disk drives 330, or to multiple sets of such devices. Storage controller 314 may be communicatively coupled to such devices through any suitable combination of intervening equipment, such as any necessary cabling (e.g., cable 324), storage interfaces, or backplanes.

As depicted in FIG. 3, switch 310 may have coupled thereto one or more slots 320. A slot 320 may include any system, device, or apparatus configured to allow addition of one or more expansion cards to chassis 301 in order to electrically couple such expansion cards to a switch 310. Such slots 320 may comprise any suitable combination of full-height risers, full-height slots, and low-profile slots. In operation, switches 310 may manage switching of communications between individual information handling systems 302 and expansion cards coupled to slots 320. In some embodiments, slots 320 may be nonshared (e.g., each slot 320 is associated with a single information handling system 302). In other embodiments, one or more of slots 320 may be shared among two or more information handling systems 302. In these and other embodiments, one or more slots 320 may be configured to be compatible with PCIe, generalized PC bus switch, Infiniband, or other suitable communication specification, standard, or protocol.

In the example of FIG. 3, each disk drive 330 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 330 are depicted as being internal to chassis 301 in FIG. 3, in some embodiments, one or more disk drives may be located external to chassis 301 (e.g., in one or more enclosures external to chassis 301).

When a system (e.g., system 300) is architected so as to allow information handling information handling resources (e.g., PCIe adapters coupled to slots 320) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 320, may be virtualized across multiple information handling systems 302. Non-shared resources or devices may be partitioned such that they are visible only to a single information handling system 302 at time. Chassis management controller 312 may be configured to handle routing and switching through switches 310 to affect sharing of a resource to multiple information handling systems 302 or to affect dedicated assignment of a resource to a single information handling system 302.

Figure 4:
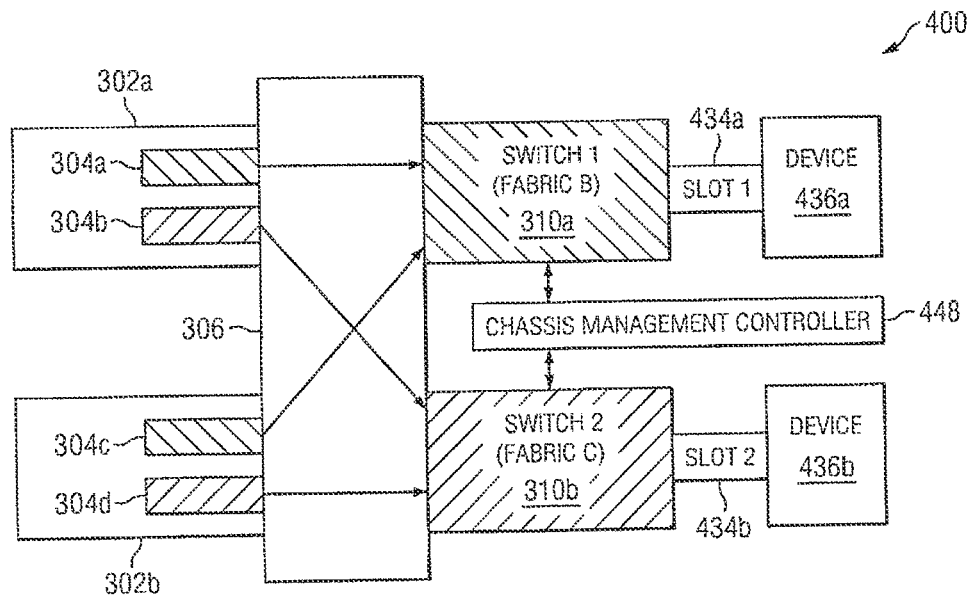
FIG. 4 illustrates a more detailed block diagram of an example system configured to provide completion notification in a modular chassis for information handling systems in accordance with certain embodiments of the present disclosure.

FIG. 4 illustrates a more detailed block diagram 400 of example system 300 configured to provide completion notification in modular chassis 301 for information handling systems 302 in accordance with certain embodiments of the present disclosure. In one embodiment, system 300 may be configured to perform such completion notification utilizing the SR-IOV or MR-IOV configuration of a device. Any suitable device may be used. In a further embodiment, such a device may include a storage device.

Chassis 301 may include a chassis management controller 448 communicatively coupled to switches 310. The APIs of chassis management controller 448 may provide the interface to for configuring IOV. Chassis management controller 448 may be configured to manage both switches 310.

Chassis 301 may include multiple information handling systems 302. Chassis 301 may include any suitable number of information handling systems 302. In one embodiment, information handling systems 302 may be referred to as "blades".

Each information handling system 302 may include cards 304, as described in association with FIG. 3. Switches 310 may contain PCIe cards instead of typical blade Ethernet, Fibre Channel or InfiniBand cards. Interfaces 304 of the information handling systems 302 may attach to switches 310 through the cards of switches 310. Switches 310 may connect information handling systems 302 to slots 434. Slots 434 may include one or more of the slots 320 of FIG. 3 in any suitable combination.

In one embodiment, each of information handling systems 302 may be communicatively coupled to each of switches 310 through one of interfaces 304 resident on the information handling system 302. For example, information handling system 302a may be communicatively coupled to switch 310a through interface 304a and to switch 310b through interface 304b. Information handling system 302b may be communicatively coupled to switch 310a through interface 304c and to switch 310b through interface 304d. Thus, each of switches 310 may provide its switching fabric to each of information handling systems 302 in order to route the given information handling system 302 to respective slots 434 associated with the switch 310.

Slots 434 may be configured to connect to associated devices 436, though fewer devices may be present than the associated capacity of chassis 301. Chassis 301 may include any suitable number of slots 434. In one embodiment, devices 436 may include PCIe-based cards or devices. Each such device 436 may represent an information handling resource to be selectively, for example, shared among multiple information handling systems 302 or dedicated to a single information handling system 302. Device 436 may comprise any suitable device such as a RAID controller, network card, or other information handling resource. In one further embodiment, devices 436 may include PCIe-based storage cards or devices. In another embodiment, devices 436 may include SSD storage cards or devices.

In order to support IOV, the driver and firmware of device 436 may include support for SR-IOV. To maintain routes between given information handling systems 302 and slots 434, switches 310 may include virtual hierarchies from slots 434 to information handling systems 302. Particular functions, such as virtual functions or shared functions, for single root IOV for a given device 436 may be mapped in switch 310, providing behavior similar to MR-IOV. In one embodiment, wherein device 436 contains multiple information handling resources such as a storage device and a USB interface, a function may be provided for each such information handling resource. Thus, from the perspective of information handling systems 302 the multiple such information handling resources may appear to be separate and unrelated. Furthermore, a virtual function may be provided for each such information handling system 302 that may share access to device 436. A given slot 434 or device 436 which has been virtualized may be accessed by such two or more virtual functions, which allow the sharing of the resource. Physical functions, as opposed to the above-described virtual functions or shared functions, may be mapped or stored in chassis management controller 448. A physical function representing an information handling resource may be provided to a single information handling system 302. In cases where a device 436 contains multiple information handling resources, individual physical functions may be provided for each such resource. Multiple instances of a virtual function may be provided to multiple information handling systems 302. If, for example, multiple information handling systems 302 are sharing a device 436 that is a storage device, then access to device 436 may be divided into multiple storage devices using virtual functions, each of which are mapped by switches 310 to the respective information handling system 302. Furthermore, specific APIs for accessing a given device 436 may be mapped or stored in chassis management controller 448.

In operation, a single root IOV information handling resource such as device 436a may be communicatively coupled to multiple information handling systems, such as information handling system 302a and information handling system 302b. Devices such as device 436a may be virtualized or shared through control within chassis 301, such as control by chassis management controller 448.

Code executing on information handling system 302a or information handling system 302b may access device 436a through calling functions in an API. The code executing simultaneously on each such information handling system 302 may issue commands or functions that are to be executed on device 436a. Device 436a may respond to the specific information handling system 302 that initiated the command to notify that the command has completed. Furthermore, device 436a may communicate with particular one or more of information handling systems 302 that need to be notified of an event that specifically addresses a given information handling system 302. For a given response or notice, device 436a may avoid communicating with information handling systems 302 that do not need to receive a copy of the response or notice.

Figure 5:
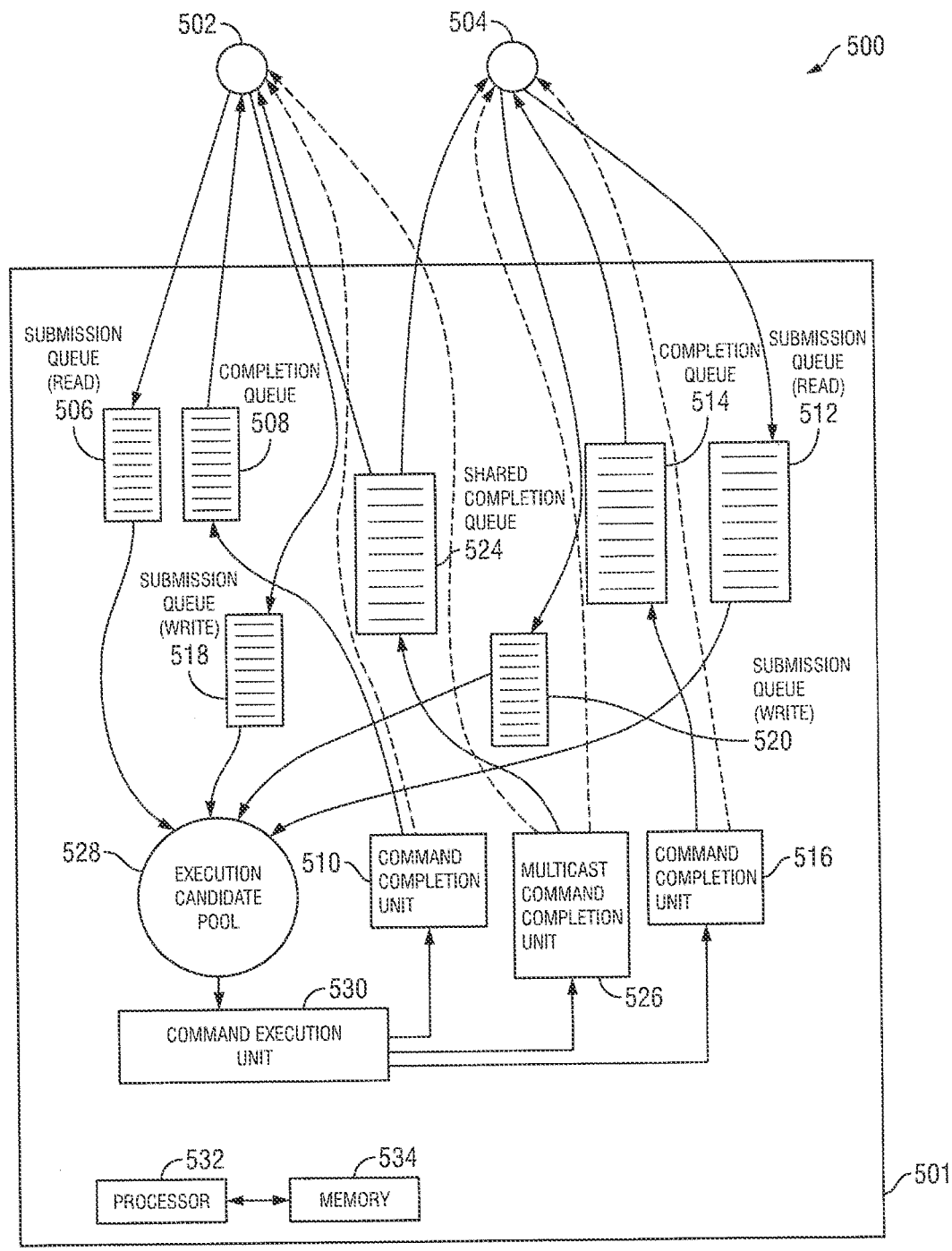
FIG. 5 illustrates a more detailed diagram of an embodiment of a device configured to conduct completion notification in accordance with certain embodiments of the present disclosure.

FIG. 5 illustrates a more detailed diagram of an embodiment of system 500 with a device 501 configured to conduct completion notification in accordance with certain embodiments of the present disclosure. Such a device 501 may be implemented by, for example, include device 436a or device 136. Device 501 may be configured to conduct completion notification to information handling systems or virtual information handling systems. In one embodiment, device 501 may be configured to conduct completion notification to information handling systems or virtual information handling systems utilizing virtualized access of its resources. In a further embodiment, device 501 may use SR-IOV. In another, further embodiment, device 501 may use MR-IOV. In a further embodiment, device 501 may use MR-IOV through use of SR-IOV. In yet another embodiment, device 501 may use a hypervisor to provide virtualized access of its resources. As described above, device 501 may further support various interface device types. For example, device 501 may implement Non-Volatile Memory Express ("NVMe") interface for allowing access information handling systems 302, 102, or virtual information handling systems 202 to access resources of device 501 such as storage.

As described in associated with FIGS. 1, 2, and 4, access to device 501 may be made for a plurality of hosts 502, 504. Hosts 502, 504 may each implement any suitable computing entity, such as information handling systems (e.g., as information handling systems 102, 302), virtual information handling systems (e.g., as virtual information handling systems 202) or multiple operating systems or virtual machines on a given information handling system. Hosts 502, 504 may connect to device 501 through a switch (e.g. switch 310a), interconnect (e.g. as PCIe interconnect and switching domains 106), or any other suitable mechanism. In one embodiment, access to device 501 by hosts 502, 504 may be virtualized. In order to facilitate such virtualization, device 501 may provide virtualization functions configured to provide access for an individual host. Furthermore, such virtualization may be provided by a hypervisor with functions or API calls. The virtual functions may include logic, code, or instructions resident with a memory of device 501 such as memory 534 or within I/O command logic 208. With regards to the example of FIG. 4, a link may be established between device 501 and an information handling system (such as information handling system 302a) such that access by information handling system 302a of device 436a is made through the virtual function. With regards to the example of FIG. 2, a link may be established between device 501 and an application, operating system, driver, or other entity executing on virtual information handling system 202.

Device 501 may include device resources used in the operation of device 501. Such resources may include, for example, memory, data structures in memory, functions in memory, ports, registers, or processor resources. These device resources may be accessed or otherwise used in the operation of device 501 through APIs, shared libraries, functions, or other mechanisms to allow the use of device 501 by other entities. In one embodiment, access of functions within the API for device 501 may be made according to virtual functions. Such virtual functions may be provided by hypervisor 206.

Device 501 include a memory 534 coupled to a processor 532. Memory 534 may be implemented by a computer-readable media. Processor 532 include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. Processor 532 may interpret and/or execute program instructions and/or process data stored in memory 534. The program instructions and/or process data stored in memory 534 may be configured to cause device 501 to operate in the manner described above and herein.

The execution of commands by initiated by hosts 502, 504 in device 501 may be accomplished through an initiator-responder protocol. A function may be associated with one or more command queues. Furthermore, multiple functions may be associated with the same one or more command queues. In embodiments utilizing virtual functions, each such virtual function instance may be associated with a different command queue. Command queues may be implemented within memory 534. Command queues may include submission queues, in which a command to be executed by or on device 501 is submitted for execution. A command submitted for execution in a submission queue may be executed by device 501 through any suitable process of workflow management. Furthermore, command queues may include completion queues, in which the results or notifications resulting from the executed commands are returned. The results or notifications may be placed in an appropriate completion queue by device 501 after execution of the command taken from the submission queue. A command queue may be specific to an individual command or function for device 501 or may be shared among multiple such commands or functions. Such sharing among multiple commands or functions may be made among commands or functions of similar scope, type, or effect. In order to distinguish among multiple completion queues, each completion queue may include a unique identifier. Such a unique identifier may be used to register a given host, information handling system, or virtual function to receive outputs from the completion queue.

In some applications, communication between a storage device and an information handling system may be conducted through message passing, utilizing an external link to a subscriber such as a Serial Attached Small Computer System Interface, Ethernet, or Infiniband. Such a communications link is outside the infrastructure of a storage device or a storage subsystem including the storage device and may cause overhead or latency. If the storage device is shared among multiple information handling systems or hosts, each write to the storage device or change in status of the storage device may cause a message to be generated to each of the systems sharing the device. The generation and sending of such a message may be expensive in terms of computing resources. Furthermore, the serial nature of some communications paths may cause the handling of a message by multiple entities, causing further computing resource usage.

However device 501 may perform such communication through command queues implemented within device 501 or within a system hosting device 501. Device 501 may include any suitable number or combination of such command queues. Device 501 may include one or more command queues specific to functions, one or more command queues specific to an individual or class of commands from a function, or one or more command queues shared by functions. For example, device 501 may include a submission queue 506 associated with a completion queue 508. These queues may be associated with an instance of a function, such as a virtual function, and may accept commands issued through the function. Device 501 may include another submission queue 512 associated with another completion queue 514. These queues may be associated with another function and may accept commands issued through the other function. Furthermore, device 501 may include yet another set of submission queues 518, 520 configured to accept commands or functions issued through yet another function. Submission queues 518, 520 may be associated with a shared completion queue 524.

Each submission queue may be communicatively coupled to an execution candidate pool 528. Device 501 may be configured to utilize execution candidate pool 528 to determine how to prioritize, balance, or otherwise manage entries in submission queues 506, 512, 518, 520 for execution by device 501. Execution candidate pool 528 may be implemented in memory 534, and by any suitable mechanism such as a function, library, module, software, application, script, or other entity.

Execution candidate pool 528 may be communicatively coupled to command execution unit 530 and configured to send commands to command execution unit 530 as they are selected for execution from execution candidate pool 528. Command execution unit 530 may coordinate processing and memory resources such that a command identified from execution candidate pool 528 is executed by device 501. Furthermore, command execution unit 530 may be configured to determine results of execution by device 501. Command execution unit 530 may be implemented in memory 534, and by any suitable mechanism such as a function, library, module, software, application, script, or other entity.

Command execution unit 530 may be communicatively coupled to one or more command completion units, such as command completion unit 510, command completion unit 516, or multicast command completion unit 526. Command execution unit 530 may be configured to send results of execution to one or more of the command completion units. In one embodiment, command execution unit 530 may be configured to send results of execution to a command completion unit associated with the submission queue from which the command was entered. In another embodiment, command execution unit 530 may be configured to send results of execution to each command completion unit, wherein the command completion units will determine to which completion queues results will be sent.

Command completion unit 510, command completion unit 516, or multicast command completion unit 526 may each be configured to determine, for a received result from command execution unit 530, which, if any, completion queue should receive results. Furthermore, command completion unit 510, command completion unit 516, or multicast command completion unit 526 may each be configured to determine, for a received result from command execution unit 530, which, if any, hosts 502, 504 should be specifically notified that a result is waiting in a given completion queue based upon a previously submitted command. Thus, each of command completion unit 510, command completion unit 516, or multicast command completion unit 526 may each be communicatively coupled to one or more completion queues and one or more hosts 502, 504. For example, command completion unit 510 may be communicatively coupled to completion queue 508 and host 502; command completion unit 516 may be communicatively coupled to completion queue 514 and host 504; and multicast command completion unite 526 may be communicatively coupled to shared completion queue 524 and to hosts 502, 504. Each of command completion unit 510, command completion unit 516, and multicast command completion unit 526 may be implemented in any suitable manner, such as with an interrupt vector controller, function, library, module, software, application, script, or other entity.

Each of command completion unit 510, command completion unit 516, and multicast command completion unit 526 may be configured to send an interrupt message to one or more hosts that 502, 504 have submitted a command to a respective submission queue associated with the completion unit. The interrupt message may indicate that a new result is available on the associated completion queue. Each of command completion unit 510, command completion unit 516, and multicast command completion unit 526 may determine which of hosts 502, 504 submitted a command into a submission queue yielding a waiting result in a completion queue through registration of host 502, 504 with a function associated with the respective submission queue. For example, command completion unit 510 may communicate an interrupt to host 502 based on use of a function by host 502 to access device 501, resulting in a command entered into submission queue 506. In another example, command completion unit 516 may communicate an interrupt to host 504 based on use of another function by host 504 to access device 501, resulting in a command entered into submission queue 512. In yet another embodiment, multicast command completion unit 526 may communicate an interrupt to hosts 502, 504 based on use of yet another function by hosts 502, 504 to access device 501, resulting in a command entered into shared completion queue 524.

In order to receive a notification from a given command completion unit, hosts 502, 504 may register with device 501 through its associated functions. Thus, for example, host 502 may register with device 501 to receive completion queue notifications for completion queue 508 and shared completion queue 524 for submissions through submission queue 506 and submission queue 518, and host 504 may register with device 501 to receive completion queue notifications for completion queue 514 and shared completion queue 524 for submissions through submission queue 512 and submission queue 520.

Each of completion queues 508, 514, 524 and/or command completion units 510, 516, 526 may include a unique identifier to identify the queue among the other queues, or the unit among the other units. The unique identifier may be discoverable by entities, such as hosts 502, 504, or by internal functions of device 501 that handle access of device 501 for hosts 502, 504. Upon registration for notifications of a given completion queue, an interrupt vector for the entity requesting notification must be specified and stored or otherwise made accessible by the associated interrupt vector controller.

In the example of FIG. 5, host 502 may have registered itself with a workflow including submission queue 506, completion queue 508, and command completion unit 510 in association with a function. Such a workflow may be utilized for a function or command set that does not require wide notification of results or completion, such as a read function. The read function may include read from disk. As host 502 initiates the request for the read, host 502 may be the only necessary recipient (as opposed to host 504, for example) of an indication that the read has completed or that the contents resulting from the read are available. The indication may include an interrupt issued from command completion unite 510 that a completed entry is available in completion queue 508.

Similarly, host 504 may have registered itself with an associated workflow including submission queue 512, completion queue 514, and command completion unit 516. Such a workflow utilized for a function or command set that does not require wide notification of results or completion, such as a read function. The read function may include read from disk. As host 504 initiates the request for the read, host 504 may be the only necessary recipient (as opposed to host 502) of an indication that the read has completed or that the contents resulting from the read are available. The indication may include an interrupt issued from command completion unit 516 that a completed entry is available in completion queue 514.

For functions such as write, wherein multiple entities may need notification that an underlying storage resource has changed, hosts 502, 504 may have both registered themselves with a workflow including shared completion queue 524 and multicast command completion unit 526. Each of hosts 502, 504 may issue their write commands to respective submission queues 518, 520. As either 502, 504 may initiate the request for the write, and because both hosts 502, 504 may be affected by such a write by any entity, both hosts 502, 504 may be the recipients of an indication that the write has completed. The indication may include an interrupt issued from multicast command completion unit 526 to all registered hosts, such as hosts 502, 504.

In one embodiment, the functions associated with each of submission queues 506, 512 may be virtual functions replicating the same underlying functionality. Such virtual functions may be configured to virtualize the simultaneous access of device 501 with regards to particular functionality. Furthermore, the functions associated with each of submission queues 518, 520 may be virtual functions replicating the same underlying functionality, and may be configured to virtualize the simultaneous access of device 501 with regards to particular functionality.

In operation, information host 502, through use of a given function, may register itself with a workflow including completion queue 508 and command completion unit 510 to receive notifications from command completion unit 510 that results are available in completion queue 508. Such results may include results from commands submitted through submission queue 506. Furthermore, host 502, through use of another function, may register itself with a workflow including multicast command completion unite 526 and shared completion queue 524 to receive notifications from multicast command completion unit 526 that results are available on shared completion queue 524. Such results may include results from commands submitted through submission queue 518. In one embodiment, such results may also include results from commands submitted through submission queue 520. Host 504, through its use of a yet another function, may register itself with a workflow including completion queue 514 and command completion unit 516 to receive notifications from command completion unit 516 that results are available in completion queue 514. Such results may include results from commands submitted through submission queue 512. Furthermore, host 504, through use of still yet another function, may register itself with a workflow including multicast command completion unit 526 and shared completion queue 524 to receive notifications from multicast command completion unit 526 that results are available on shared completion queue 524. Such results may include results from commands submitted through submission queue 520. In one embodiment, such results may also include results from commands submitted through submission queue 518.

Host 502 may attempt to access the resources of device 501 through, for example, a read disk request, and may issue a command to submission queue 506. Device 501 may process the requested commands of submission queue 506 in execution candidate pool 528 and command execution unit 530 with a priority determined in consideration of all other pending commands in other submission queues. Device 501 may execute the command as it is selected for execution by command execution unit 530 and may provide results to the registered completion unit, such as command completion unite 510. Command completion unit 510 may place a result in completion queue 508 indicating that the read command has been completed and the results are available. Command completion unit 510 may generate an interrupt and send it to the registered host 502. The program or application on host 502 associated with the read command may then take appropriate action.

Host 504 may attempt to access the resources of device 501 through, example, through a read disk request, and may issue a command to submission queue 512. Device 501 may process the requested commands of submission queue 512 in execution candidate pool 528 and command execution unit 530 with a priority determined in consideration of all other pending commands in other submission queues. Device 501 may execute the command as it is selected for execution by command execution unit 530 and may provide the results to the registered completion unit, such as command completion unit 516. Command completion unit 516 may place a result in completion queue 514 indicating that the read command has been completed and the results are available. Command completion unit 516 may generate an interrupt and send it to the registered host 504. The program or application on host 504 associated with the read command may then take appropriate action.

Host 502 may attempt to access the resources of device 501 through, in another example, a write disk request, and may issue a command to submission queue 518. Device 501 may process the requested commands of submission queue 518 in execution candidate pool 528 and command execution unit 530 with a priority determined in consideration of all other pending commands in other submission queues. Device 501 may execute the command and send results to the registered completion unit, such as multicast command completion unit 526. Multicast command completion unit 526 may place a result in shared completion queue 524 indicating that the write command has been completed and the shared storage resource may have changed. Multicast command completion unit 526 may generate an interrupt and send it to all registered hosts, which may include host 502 and host 504. Programs or applications on hosts 502, 504 associated with the write may then take appropriate action.

Host 504 may attempt to access the resources of device 501 through, in yet another example, a write disk request, and may issue a command to submission queue 520. Device 501 may process the requested commands of submission queue 520 in execution candidate pool 528 and command execution unit 530 with a priority determined in consideration of all other pending commands in other submission queues. Device 501 may execute the command and send results to the registered completion unit, such as multicast command completion unit 526. Multicast command completion unit 526 may place a result in shared completion queue 524 indicating that the write command has been completed and the shared storage resource may have changed. Multicast command completion unit 526 may generate an interrupt and send it to all registered hosts, which may include host 502 and host 504. Programs or applications on hosts 502, 504 associated with the write may then take appropriate action.

Consequently, a given host 502 or host 504 need not notify other hosts or information handling systems registered to receive results from a completion queue. Furthermore, interrupts provided by a given completion queue or unit may be specific to a given function or virtual function.

Figure 6:
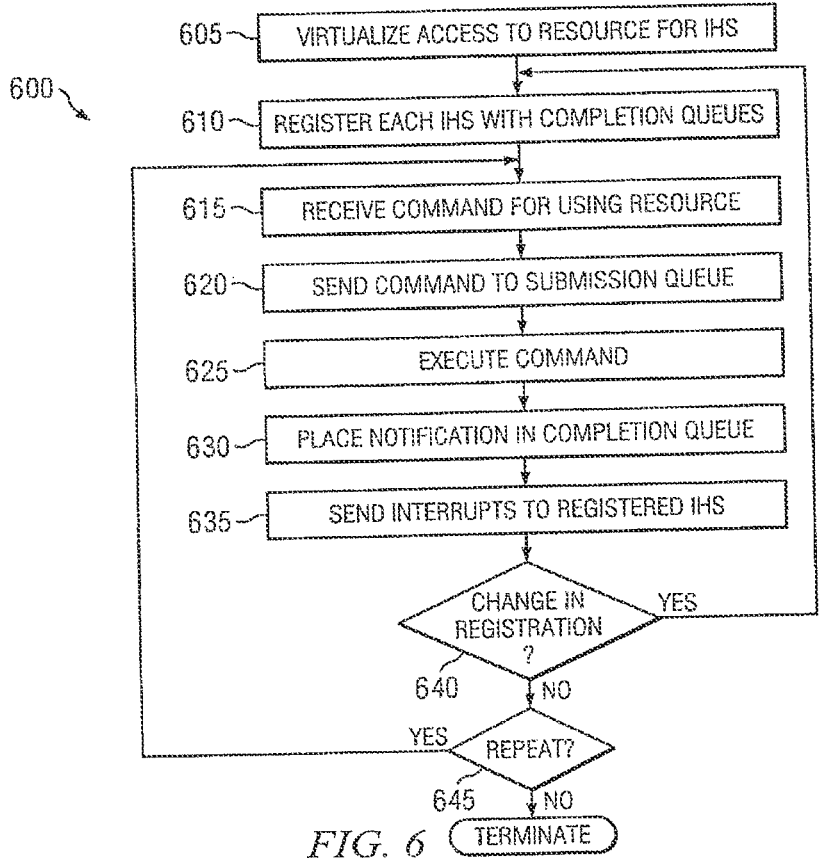
FIG. 6 illustrates a flow chart of an example method for completion notification for a device such as a storage device in accordance with certain embodiments of the present disclosure.

FIG. 6 illustrates a flow chart of an example method 600 for completion notification for a device such as a storage device in accordance with certain embodiments of the present disclosure. Such notification may be made to subscribers or entities sharing a device. Such a device may be virtualized using, for example, a hypervisor, SR-IOV or MR-IOV. According to certain embodiments, method 600 may begin at step 605. As noted above, teachings of the present disclosure may be implemented in a variety of configurations of systems and devices 100, 200, 300, 400, and 500 as shown in FIGS. 1-5. As such, the preferred initialization point for method 600 and the order of the steps comprising method 600 may depend on the implementation chosen.

Method 600 may begin in response to any suitable stimulus or trigger. For example, method 600 may be invoked in response to an asset management decision, command, configuration, or setting. In another example, method 600 may be invoked after a change in utilization, demand, or other criteria regarding information handling resources. In these and other embodiments, method 600 may be implemented as firmware, software, applications, functions, libraries, or other instructions continually monitoring, for example, device 136, chassis 301 or device 436a. In a further embodiment, method 600 may be implemented fully or partially by such instructions within device 136, hypervisor 206, I/O command logic 208, or chassis management controller 448.

In step 605, access to a shared information handling resource such as a storage device may be shared or virtualized to a plurality of hosts or information handling systems. Virtualization may be performed by a hypervisor, SR-IOV, or MR-IOV through SR-IOV. Virtualization of the shared information handling resource may include providing a virtual function for each such host or virtual function access for each such host that will share the virtualized information handling resource. Furthermore, a function for possible commands, virtualized or otherwise, may be provided to access the shared information handling resource.

In step 610, each such host may be registered with any necessary completion queue. Any suitable number and kind of completion queues may be registered with by a given host. One or more such completion queues may be dedicated to a single host, while one or more such completion queues may be registered with multiple host. The assignment of a single or multiple host to a given completion queue may depend upon the nature of a command or a set of commands. For example, a completion queue for a read disk command may be assigned to a single host, while a completion queue for a write disk command may be assigned to every such host accessing the disk.

In step 615, a command for using a resource of the device may be received from an application or program on a given host through the virtual function associated therewith. In step 620, the command may be placed in a submission queue designated to accommodate the command and registered with the host making the request. In step 625, the command may be executed.

In step 630, a notification that the command has been executed may be placed in the associated completion queue. The completion queue may be mapped to one or more hosts that have registered with the completion queue. A completion queue may accept entries completed from one or more submissions queues. In step 635, interrupts indicating the completion of the command may be sent to the registered hosts. The interrupt may be sent through the virtual function associated with the host.

In step 640, it may be determined whether there has been a change in information handling registration, such as adding or removing a host from a larger system, or the resource needs of a host have changed. If registration has changed, then method 600 may proceed to step 610. If registration has not changed, then method 600 may proceed to step 645. In step 645, method 600 may be optionally repeated as a whole or in part, or may be terminated.

Although FIG. 6 discloses a particular number of steps to be taken with respect to method 600, it may be executed with greater or lesser steps than those depicted in FIG. 6. In addition, although FIG. 6 discloses a certain order of steps to be taken with respect to method 600, the steps comprising method 600 may be completed in any suitable order.

Method 600 may be implemented using system 300, components thereof or any other system such as those shown in FIGS. 1-5 operable to implement method 600. In certain embodiments, method 600 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An apparatus comprising:
   an interface configured to provide access to the apparatus for a first information handling system and a second information handling system;
   an information handling resource;
   a first submission queue configured to be registered with the first information handling system and to receive commands from the first information handling system for accessing the information handling resource; and
   a second submission queue configured to be registered with the second information handling system and to receive commands from the second information handling system for accessing the information handling resource;
wherein:
upon execution of a command from the first submission queue or the second submission queue, the interface is configured to selectively send an interrupt to the first information handling system and the second information handling system.

2. The apparatus of claim 1, wherein:
the apparatus is configured to virtualize access to the information handling resource; and
the first information handling system and the second information handling system share the information handling resource using the virtualized access.

3. The apparatus of claim 2, wherein the information handling resource is virtualized using a hypervisor.

4. The apparatus of claim 1, wherein:
the apparatus further comprises:
a third submission queue configured to be registered with the first information handling system and to receive commands from the first information handling system; and
upon execution of commands in the third submission queue, the interface is configured to selectively send an interrupt to the first information handling system.

5. The apparatus of claim 4, wherein the first submission queue and the third submission queue are configured to accept different commands from one another.

6. The apparatus of claim 4, wherein the interrupt is selectively sent based on an identity of a command that has been executed.

7. The apparatus of claim 4, wherein:
the apparatus further comprises:
a fourth submission queue configured to be registered with the second information handling system and to receive commands from the second information handling system; and
upon execution of commands in the fourth submission queue, the interface is configured to selectively send an interrupt to the second information handling system.

8. A method for providing notification of completion of a computing task, comprising:
providing access to an information handling resource for a first information handling system;
submitting commands from the first information handling system to a first submission queue;
providing access to the information handling resource for a second information handling system;
submitting commands from the second information handling system to a second submission queue;
upon execution of commands in the first submission queue and the second submission queue, selectively sending an interrupt to the first information handling resource and to the second information handling resource.

9. The method of claim 8, further comprising virtualizing access to the information handling resource for the first information handling system and the second information handling system wherein the first information handling system and the second information handling system share the information handling resource using the virtualized access.

10. The method of claim 9, wherein the information handling resource is virtualized using a hypervisor.

11. The method of claim 8, further comprising:
submitting commands from the first information handling system to a third submission queue; and
upon execution of commands in the third submission queue, selectively sending an interrupt to the first information handling system.

12. The method of claim 11, wherein the first submission queue and the third submission queue are configured to accept different commands from one another.

13. The method of claim 11, wherein the interrupt is selectively sent based on execution of a designated command in one of the submission queues.

14. The method of claim 11, further comprising:
submitting commands from the second information handling system to a fourth submission queue; and
upon execution of commands in the fourth submission queue, selectively sending an interrupt to the second information handling system.

15. An article of manufacture comprising:
a non-transitory machine-readable medium; and
computer-executable instructions carried on the machine-readable medium, the instructions readable by a processor, the instructions, when read and executed, for causing the processor to:
provide access to an information handling resource for a first information handling system;
submit commands from the first information handling system to a first submission queue;
provide access to the information handling resource for a second first information handling system;
submit commands from the second information handling system to a second submission queue;
upon execution of commands in the first submission queue and the second submission queue, selectively send an interrupt to the first information handling resource and to the second information handling resource.

16. The article of claim 15, wherein the processor is further configured to virtualize access to the information handling resource for the first information handling system and the second information handling system, wherein the first information handling system and the second information handling system share the information handling resource using the virtualized access.

17. The method of claim 16, wherein the information handling resource is virtualized using a hypervisor.

18. The article of claim 15, wherein the processor is further configured to:
submit commands from the first information handling system to a third submission queue; and
upon execution of commands in the third submission queue, selectively send an interrupt to the first information handling system.

19. The article of claim 15, wherein the first submission queue and the third submission queue are configured to accept different commands from one another.

20. The article of claim 15 wherein the processor is configured to selectively send the interrupt based on execution of a designated command in one of the submission queues.

21. The article of claim 18, wherein the processor is further configured to:
submit commands from the second information handling system to a fourth submission queue; and
upon execution of commands in the fourth submission queue, selectively send an interrupt to the second information handling system.

* * * * *